United States Patent Office 2,938,937
Patented May 31, 1960

2,938,937
FLAME-RESISTANT, HIGH-HEAT INSULATING COMPOSITION

Adolphus M. Shenk, Culver City, Calif., assignor to Ideal Chemical Products, Inc., Culver City, Calif., a corporation of Nevada No Drawing. Filed Mar. 23, 1955, Ser. No. 496,315

9 Claims. (Cl. 260—736)

This invention relates to flame-resistant, high-heat insulating compositions which can be applied as coatings by troweling or spraying or which can be cast to form objects of various shapes.

It is well known that commonly available structural materials, particularly the well-known metals, cannot be used in certain structural parts of rockets and jet-propelled missiles because of their inability to withstand the high temperatures and severe temperature fluctuations incident to the operation of rockets and jet-propelled missiles. It is therefore an object of this invention to provide a composition which may be used as a coating on metal and other parts of rockets and jet-propelled missiles, or may be cast to form such parts.

Another object of the invention is to provide such a composition which will retain its insulating properties upon prolonged exposure to high temperatures.

Another object of the invention is to provide such a composition which is highly adhesive and forms an efficient bond with objects to which it is applied.

Another object of the invention is to provide such a material which is in the form of a mastic when applied but which will set in a short time to form a solid mass having resilient properties such that it will not check or crack when subjected to high impact, extreme fluctuations in temperature, and bending stresses.

Another object of the invention is to provide such a composition which will, when applied to metal, prevent corrosion due to water, acids and other chemical agents.

Another object is to provide such a composition which will deaden sound and prevent condensation on the objects.

It is also well known that structural materials such as steel lose their structural properties upon exposure to high temperatures. It has been heretofore suggested that refractory coatings may be used to protect the structural objects since the refractory coatings are incombustible and have high heat resistance. However, such refractory coatings do not insulate, and as a result the structural objects may lose their structural properties upon exposure to high temperatures and may even melt. In addition, the refractory coatings or coverings may chip or shatter upon impact and may crack with rapid changes of temperature. It has also been suggested that structural objects may be protected by plaster, concrete or other inorganic materials which are incombustible and may possess some insulating value at normal temperatures. However, such materials are relatively brittle and porous and crack, splinter and spall upon exposure to high temperatures. In addition, such materials absorb water, grease, oils, inflammable liquids and thereby produce a fire hazard. Such materials are affected by acids and other corrosive chemical agents. Moreover, the bond between the structural objects and the materials is poor and the structural objects, if made of metal, are not protected from corrosion.

It is therefore another object of this invention to provide a composition which can be applied to structural objects such as steel, concrete, wood and the like which will effectively insulate the structural object at extremely high temperatures, on the order of 6000° F. When applied to metal objects the coating will not only prevent the metal from melting but will also prevent the metal from deforming. Another object is to provide such a composition which has excellent weatherability.

It is also well known that in vehicles which are used to transport high explosives, the danger of serious fires is a great hazard particularly since the vehicles are usually employed on public highways. The danger is particularly great in the case where the explosives are transported by motor trucks or tractor trailers equipped with dual tires. When one tire becomes deflated, a fire is usually initiated from overheating of the deflated tire from friction. The operator is usually unaware of this condition until the fire has progressed to the dangerous point. It is therefore an object of this invention to provide a coating which may be applied to such vehicles, to effectively insulate any possible fire from the highly explosive cargo. It is a further object to provide such a composition which will remain bonded to the surfaces of the vehicle and withstand shocks, jolts, and abrasion from stones and gravel incident to operation of the vehicle.

It is also well known that a major problem in the railroad industry is the destruction of ties, trestles, bridges and culverts caused by fires, in addition to financial loss due to traffic tie-ups which result from the fires. These fires are initiated by sparks from the train or flares which either strike the ties or trestles directly or strike tumbleweed, grass, or brush, which accumulates or spreads in the area surrounding the ties or trestles. Where timbers impregnated with creosote are used in the construction of these structures, the fire hazard is increased because of the tendency of the creosote vapors to provide combustible gases to the fire. Previous attempts to coat the creosote timber have proved unsuccessful since the creosote prevents a good bond between the coating and the timber.

It is therefore an object of this invention to provide a coating which may be applied to ties, trestles, bridges, culverts and the like to effectively protect these objects from fire. More specifically, it is an object to provide such a composition which may be applied to creosoted timbers.

Another object of the invention is to provide a composition which may be applied to glass surfaces providing a good bond therewith, in addition to the other properties inherent in the composition.

Basically the flame-resistant, high-heat insulating composition of this invention is cold setting air drying and comprises a mixture of a filler, a vehicle including a binder and mineral materials, and a solvent. The composition has a paste-like consistency so that it may be troweled or sprayed by the use of heavy-duty spray equipment. The composition having the proper consistency may be called a paste or mastic for purposes of convenience.

The amounts of filler and vehicle including the binder and mineral materials are preferably in the following ranges:

| | Percent |
|---|---|
| Filler | 15–35 |
| Vehicle: | |
| Binder | 18–35 |
| Minerals | 30–65 |

Examples of satisfactory compositions have been found to be as follows:

| Binder | Mineral Materials | Filler Materials |
|---|---|---|
| 24.25 | 54.0 | 21.75 |
| 18.0 | 65.0 | 17.0 |
| 35.0 | 50.0 | 15.0 |
| 35.0 | 30.0 | 35.0 |

The filler which is used in the composition is preferably a mixture of expanded micaceous material such as vermiculite and asbestos in the following ranges:

|                      | Percent |
|----------------------|---------|
| Expanded Vermiculite | 10–55   |
| Asbestos             | 90–45   |

Various expanded or exfoliated micaceous materials may be used instead vermiculite. For example, a mixture of perlite and diatomaceous earth may be used in place of the expanded vermiculite. The asbestos which is used is of the long fiber type having fiber lengths preferably ranging from 3/16 to 1/4 inch. In some instances, the fiber length may be approximately 1/8 inch.

The binder which is utilized in the vehicle comprises a mixture of chlorinated rubber, chlorinated resin and a plasticizer in the following ranges:

|                    | Percent  |
|--------------------|----------|
| Chlorinated Rubber | 27½–55   |
| Chlorinated Resin  | 10 –50   |
| Plasticizer        | 22½–35   |

The chlorinated resin may be chlorinated terphenyl or chlorinated paraffin or a mixture thereof. The chlorinated terphenyl is a commercially available material containing approximately 42 to 60% chlorine. The chlorinated paraffin is a commercially available material containing approximately 70% chlorine.

The plasticizer may comprise chlorinated biphenyl, butyl benzyl phthalate, tricresyl phosphate, triphenyl phosphate, cresyl diphenyl phosphate or tritolyl phosphate, or a mixture thereof. The chlorinated biphenyl is a commercially available material containing 48 to 60% chlorine.

The mineral materials comprise inert, inorganic materials and preferably a mixture of antimony oxide, calcium carbonate, titanium dioxide and asbestine in the following ranges:

|                   | Percent |
|-------------------|---------|
| Antimony Oxide    | 5–15    |
| Calcium Carbonate | 15–50   |
| Titanium Dioxide  | 40–80   |
| Asbestine         | 10–40   |

Asbestine is a milled mixture of talc and asbestos.

The percentage composition of the binder and mineral materials in the vehicle based on the total weight of the vehicle is 20–75% binder and 25–80% mineral materials.

The amount of volatile aromatic solvent present is such that the composition may be troweled or sprayed. We have found that toluene and xylene give satisfactory results. The amount of solvent may range from 14.4 to 55% of the total weight of the composition.

Various coloring pigments or materials may be added to give any desirable color to the composition.

The composition is preferably prepared by mixing the materials at room temperature without the addition of heat. The chlorinated rubber, chlorinated resin and plasticizer are first thoroughly mixed in a small amount of solvent to form a solution. The mineral materials are then added to the solution and thoroughly mixed therein and the entire mixture is then passed through milling rolls. Finally the filler, namely the expanded vermiculite and asbestos, is added and mixed thoroughly; and the required amount of solvent is also added to provide the consistency necessary for troweling or spraying the resultant paste by the use of heavy-duty equipment. By the above process, the asbestos fibers become coated with a thin coating of vehicle which is strongly bonded to the asbestos and, it is believed, contributes to the cohesiveness, tenacity and toughness of the resultant coating.

The prepared composition is applied to various objects as a coating by troweling or spraying. In the case of metal surfaces, the surfaces are first thoroughly cleaned, for example by sand blasting and chemical treatment, and a prime coat of the final composition is applied to the clean surface, followed by successive coats of the composition to provide the effective thickness required. Alternatively the prime coat may comprise the mixture of binder and mineral materials, rather than the entire composition of binder, mineral and filler materials.

In the case of non-metallic surfaces such as wood, fiberboard, glass and the like the paste may be applied directly to the surface.

After the paste has been applied, the coating will become set upon evaporation of the volatile solvent. This occurs at room temperature; but if desired, a small amount of heat, on the order of approximately 180° F., may be applied to accelerate the setting action. Care must be exercised where heat is used in order to prevent the coating from not bonding properly to the surface being coated. In the event that the coating does not bond properly because of the application of heat, the composition may be removed by using a volatile aromatic solvent and a fresh coating may then be applied.

The coating may be applied in various thicknesses ranging from 1/32 of an inch to 4 inches or more, depending on the insulating properties required. The coating is preferably applied in successive layers to provide the most efficient bond.

The resultant coating provides an effective flame-resistant, high-heat insulating composition which is efficiently bonded to the surface. The coating is sufficiently hard that it cannot become displaced and yet possesses resilient or flexible properties such that it will not check or crack when subjected to high impact and extreme fluctuations in temperature. In addition, when applied to metal the coating prevents corrosion due to water, acids and other chemical agents.

In addition to being used as a coating, the composition may be shaped or molded to form objects having the properties inherent in the composition.

The following examples are illustrative but do not limit certain embodiments of the invention:

EXAMPLE 1

|                   | Percent |
|-------------------|---------|
| Vehicle A         | 72.7    |
| Vermiculite       | 4.3     |
| Long fiber asbestos | 23.0  |
|                   | 100.0   |

In preparing the above composition, the vermiculite is slowly added to the vehicle and thoroughly dispersed therein by slow stirring. The asbestos is then slowly added and the mixture stirred until a substantially complete dispersion is obtained. The consistency of the mix is fairly heavy, but it may be applied easily by troweling or by spraying with special equipment of the type used in spraying cement mixtures.

Vehicle A used in Example 1 is composed of the following ingredients, using the proportions indicated:

|                      | Percent |
|----------------------|---------|
| Chlorinated rubber   | 7.3     |
| Chlorinated paraffin A | 3.4   |
| Tricresyl phosphate  | 3.1     |
| Adhesive A           | 3.7     |
| Xylene               | 23.0    |
| Antimony trioxide    | 10.1    |
| Whiting              | 3.4     |
| Titanium dioxide     | 10.5    |
| Asbestine            | 35.5    |
|                      | 100.0   |

This vehicle may be prepared in the following manner: using approximately 2/3 the total amount of xylene (aromatic solvent), the chlorinated rubber and chlorinated paraffin A is put into solution by stirring. The tricresyl phosphate and adhesive A are placed in a heavy duty mixer, the motor started and the antimony trioxide, whiting, titanium dioxide and asbestine added. These materials are mixed to a thick paste, using a sufficient amount of the solution of chlorinated rubber and chlorinated paraffin. The thick paste is then passed through tight milling rolls, preferably three heavy rolls, into a container where the remainder of the rubber-paraffin solution is added. The balance of the xylene is then added with stirring, and the mixture filtered through a coarse screen.

The chlorinated rubber used in the above described vehicle is a commercially available product containing 67 percent chlorine and having a viscosity range of 15 to 23 centipoises in a 20 percent solution in toluene.

The chlorinated paraffin A used in the above example is a commercially available wax-like resin containing 69–72% chlorine.

Tricresyl phosphate is an excellent plasticizer for use in a composition of this type. However, there are other first-resistant plasticizers which may be used, such as cresyl diphenyl phosphate, triphenyl phosphate, etc. The above designated adhesive A is formed from the following ingredients, using the proportions indicated:

| | Percent |
|---|---|
| Nonochlorterphenyl | 22 |
| Chlorinated vegetable oil | 56 |
| Xylene | 22 |
| | 100 |

The chlorinated vegetable oil used in adhesive A is oiticica oil, containing approximately 40 percent chlorine.

In addition to xylene in the vehicle composition, other volatile aromatic solvents such as toluene, benzene, etc. may be used.

In applying the coating composition specified in Example 1 to a metallic surface, the surface to be coated is first primed with a coat of vehicle A. On surfaces other than metal, such as wood, cement, brick, etc., no primary coat is necessary. The coating composition is then sprayed onto the surface and built up to the desired thickness. The material sets in about thirty minutes (more or less, depending upon the thickness of coating desired) to a solid mass having excellent adherence to the surface coated, as well as resilient properties with resultant high resistance to cracking or chipping. The material is white in color and has a surface somewhat rough in texture. A smooth surface may be obtained, however, by applying a finish coat of vehicle A, if desired.

EXAMPLE 2

| | Percent |
|---|---|
| Vehicle A | 62.8 |
| Vermiculite | 3.7 |
| Medium fiber asbestos | 19.9 |
| Washed sharp sand | 13.6 |
| | 100.0 |

The method of making this composition is similar to that employed with respect to Example 1, the sand here being added as the last ingredient. Care must be taken to thoroughly disperse, by stirring, the sand throughout the mixture so that substantially every particle of sand is coated with the vehicle to avoid any substantial loss in the cohesion of the mass.

The product made in accordance with Example 2 has excellent abrasion-resistant qualities and may be used, for example, as a flooring material. In applying this composition on metallic surfaces, a preliminary primer coat consisting of vehicle A should be used.

EXAMPLE 3

| | Percent |
|---|---|
| Vehicle A | 57.5 |
| Vehicle B | 13.7 |
| Vermiculite | 4.6 |
| Long fiber asbestos | 24.2 |
| | 100.0 |

The above composition is prepared by first mixing vehicle A and vehicle B. The vermiculite is slowly added and thoroughly dispersed by stirring slowly. The asbestos is finally added in the same manner.

Vehicle A is the same as that set forth in Example 1. Vehicle B is composed of the following ingredients using the proportions indicated:

| | Percent |
|---|---|
| Toluene | 66.8 |
| Chlorinated terphenyl A | 18.7 |
| Chlorinated rubber | 6.2 |
| Chlorinated paraffin B | 8.3 |
| | 100.0 |

Vehicle B may be prepared in the following manner: The chlorinated rubber and chlorinated terphenyl are put into solution with approximately ⅔ the total amount of toluene. The chlorinated paraffin is then added, the batch thoroughly agitated until the paraffin is in solution, and then the remainder of the toluene is added to the solution.

The chlorinated terphenyl A is a commercially available resinous material containing approximately 60 percent chlorine.

The chlorinated paraffin B used in vehicle B and in vehicle C below is a commercially available chlorinated paraffin wax containing 42–43% chlorine, having a viscosity at normal temperatures of between 22.5 and 31.5 poises (equivalent to approximately 40 seconds for 10 inch fall of ½ inch aluminum ball in 1 inch tube).

Coating compositions prepared in accordance with Example 3 may be applied directly to a metallic surface without a preliminary primer coat, as is necessary with respect to Example 1.

Various color pigments may be incorporated in compositions made in accordance with my invention. The following example is illustrative of one such composition:

EXAMPLE 4

| | Percent |
|---|---|
| Vehicle A | 56.2 |
| Vehicle C | 15.7 |
| Vermiculite | 4.4 |
| Long fiber asbestos | 23.7 |
| | 100.0 |

Vehicle A and vehicle C are mixed thoroughly. The vermiculite is then added slowly and thoroughly dispersed by stirring slowly. The asbestos is then added in the same manner.

Vehicle A is the same as that set forth in Example 1. Vehicle C is composed of the following ingredients using the proportions indicated:

| | Percent |
|---|---|
| Toluene | 57.3 |
| Chlorinated terphenyl A | 16.5 |
| Chlorinated rubber | 3.8 |
| Antimony trioxide | 4.7 |
| French whiting | 4.7 |
| Chlorinated paraffin B | 5.9 |
| Chrome yellow | 4.0 |
| Chrome green | 3.1 |
| | 100.0 |

Vehicle C is prepared in the following manner: First the chlorinated rubber and then the chlorinated terphenyl is added to ⅔ the total amount of toluene in a heavy duty mixer and the mass agitated until the rubber and terphenyl are in solution. The color pigments, antimony trioxide, French whiting and chlorinated paraffin are mixed together in a separate container. Sufficient of the chlorinated rubber and chlorinated terphenyl solution is added to this mixture to form a thick paste. This paste is passed through tight milling rolls into a container where the remainder of the chlorinated rubber and chlorinated terphenyl solution is added with agitation to thoroughly combine the ingredients.

It is to be understood that the composition disclosed in Example 4 is similar to that of Example 3 in that no primer coat is necessary. The material may be sprayed or troweled directly onto the surface to be coated with no preliminary preparation other than that necessary to assure a clean, dry surface. When applying any of these compositions to a metallic surface, it is necessary, in order to assure a good bond and to prevent corrosion, to first clean the metal of any oxidized scale by pickling, sand blasting or grit blasting.

When the composition is applied as a coating to the surface of metal parts used in rocket and jet-propelled missiles, the resultant parts have been found to possess an unusual resistance to high temperatures and severe fluctuations in temperature. The composition has been used specifically in coating metal booster tubes of rockets.

The composition may also be used to protect metal landing mats from the high temperature exhaust gases of jet-propelled aircraft.

When applied to structural materials such as steel, the structural materials are not only insulated and prevented from melting, but in addition, the loss of the structural properties of the material is prevented. This has been shown by various tests. For example, a 2"x2"x¼" angle iron, 10 feet long, was prepared with two ½" metal plates approximately 18" square, welded on each vertical end. The entire angle, but not the plates, was reinforced by wrapping with diamond shaped expanded metal spot welded. The entire angle and underside of plates were troweled and sprayed with a ¼" to ½" thickness of the composition. First application was permitted to cure approximately three weeks. Second application was permitted to cure approximately two and one half weeks. The angle was placed in a vertical position in a deep pit. Lead ingot weights of 150 lbs. were placed topside of steel plate. The angle was secured level and plumb. The pit was filled with water up to within ten to twelve inches of the top of pit. Gasoline and other chemicals were poured on surface of water and set afire.

At the conclusion of the fire tests and immediately following cessation of flame, 800 lbs. of water pressure was turned directly on the coating of the angle. Some small portions of outer layer of coating tore off exposing bottom layer of coating, which was still in excellent condition.

At the expiration of seventeen minutes burning time, during which temperatures of 3000°–4000° F. were reached, the composition had done a very satisfactory job in preventing the weighted steel angle from bending or buckling or losing any of its structural strength. Similar tests conducted on uncoated angles resulted in buckling and bending of the steel to the ground in one minute and thirty seconds.

In another test a quarter inch thick steel plate was coated with a half inch thick coating of the flame-resistant, high-heat insulating composition, and it was found that the hand could be safely held against the coating even though a welding arc was applied to the uncoated side of the plate. This is believed to be a significant indication of the effectiveness of the coating composition, since the temperature of a sustained electric arc is estimated at approximately 10,000° F. In addition to these tests, numerous tests have been conducted which show that the composition of this invention can be used effectively to insulate wood shingle roofs, supporting structures and timbers of grandstands, and other similar structures. The composition has also been effectively tested in insulating wooden guard houses.

When used to protect structural objects and materials, the composition has been found to retain its insulating properties even under prolonged exposure to high temperatures, on the order of 6000° F. The bond between the coated object and the coating is highly efficient. In addition, the resultant coating protects the structural objects from corrosion due to water, acids and other chemical agents, and acts as a sound deadening material.

Another use of the composition is in protecting the undersurface of vehicles which are used to transport high explosives and insulate the cargo from heat caused by fires initiated from overheating of a deflated tire. The fires from such overheating last, in many instances, from thirty to sixty minutes, and are estimated to involve temperatures of approximately 2200° F. In this use the coating is applied preferably to the undersurfaces of the vehicle.

In addition to providing the necessary insulating properties, the coating does not crack or fall off due to shocks and jolts from the operation of the vehicle on the highway or from abrasion due to stones and gravel. The coating is highly resistant to road oils and chemicals.

It has been also found where the coating has been worn or broken away by severe impact such as continuous and prolonged impact due to a broken tire chain, the coating may be repaired by troweling more composition onto the surface.

Another use of the composition has been in protecting ties, trestles, bridges, culverts and the like utilized in the railroad industry. In this use a layer of glass fiber material is preferably applied to the surface before application of the coating.

In certain instances where it is desired to increase the resistance of the coating to bending and impact forces, a layer of reinforcing material such as wire, wire mesh, cloth, glass fiber, and the like may be applied to the surface which is to be coated or between layers of the coating composition. It has been found that the coating is efficiently bonded to the structural members even though they are made of wood impregnated with creosote. It appears that the coating permits the escape of the creosote vapors, which are volatilized at 350°–365° F. at a slow enough rate that combustion is prevented.

Another use for the coating composition has been in coating the inside walls of metal chemical tanks such as pickling tanks.

Another use of the composition has been in flame-proofing fabric material such as drapes, although the resultant fabric may be somewhat stiffened.

Although we do not wish to be limited by the theory involved, we believe that a factor in the highly successful results which have been achieved in the use of this composition is the possible generation and release of fire-extinguishing gases in the presence of heat, in addition to providing high insulating value and resilient shield from fire and flame.

This application is a continuation-in-part of my co-pending application Serial No. 147,776, filed March 6, 1950, now abandoned.

What I claim is:

1. In a coating composition, a filler comprising approximately 5 parts asbestos fiber and 1 part expanded vermiculite, and a fire-resistant vehicle for said filler including chlorinated rubber and a chlorinated hydrocarbon selected from the group consisting of chlorinated paraffin, chlorinated terphenyl and mixtures thereof, a plasticizer for said chlorinated rubber, a pigment, and sufficient volatile aromatic solvent to provide a composition having a consistency suitable for troweling or spraying, said vehicle comprising approximately three-fourths of the entire composition.

2. In a coating composition of the character described, a vehicle consisting essentially of the following ingredients in approximately the percentages by weight indicated:

| | Percent |
|---|---|
| Chlorinated rubber | 7.3 |
| Chlorinated paraffin | 3.4 |
| Tricresyl phosphate | 3.1 |
| Adhesive | 3.7 |
| Xylene | 23.0 |
| Antimony trioxide | 10.1 |
| French whiting | 3.4 |
| Titanium dioxide | 10.5 |
| Asbestine | 35.5 | where said chlorinated paraffin contains approximately 69–72% chlorine, and where said adhesive consists of 22 percent nonochloroterphenyl, 56 percent chlorinated vegetable oil and 22 percent xylene.

3. A coating composition consisting essentially of the following ingredients in approximately the proportions by weight indicated: 4.3 percent expanded vermiculite, 23 percent long fiber asbestos, and 72.7 percent vehicle as defined in claim 2.

4. A coating composition consisting essentially of the following ingredients in approximately the proportions by weight indicated: 3.7 percent expanded vermiculite, 13.6 percent sharp washed sand, 19.9 percent medium fiber asbestos, and 62.8 percent vehicle as defined in claim 2.

5. A coating composition consisting essentially of the following ingredients in approximately the proportions by weight indicated: 4.6 percent expanded vermiculite, 24.2 percent long fiber asbestos, 57.5 percent vehicle as defined in claim 2, and 13.7 percent vehicle consisting of the following ingredients in approximately the proportions indicated, 66.8 percent toluene, 18.7 percent chlorinated terphenyl containing approximately 60 percent chlorine, 6.2 percent chlorinated rubber, and 8.3 percent chlorinated paraffin containing approximately 42–43 percent chlorine.

6. In a coating composition, a filler comprising approximately five parts asbestos fiber and one part expanded vermiculite, and a fire-resistant vehicle for said filler including approximately fifteen parts of a mixture of chlorinated rubber and a chlorinated hydrocarbon selected from the group consisting of chlorinated paraffin and chlorinated terphenyl and mixtures thereof, approximately twenty-five parts solvent for said mixture, and approximately sixty parts pigment including a major proportion of asbestine, said vehicle comprising approximately three-fourths of the entire composition.

7. A structural member having a coating on a surface thereof, said coating comprising a filler containing approximately five parts asbestos fiber and one part expanded vermiculite and a vehicle including chlorinated rubber and a chlorinated hydrocarbon selected from the group consisting of chlorinated paraffin, chlorinated terphenyl and mixtures thereof, a plasticizer for said chlorinated rubber, and said chlorinated hydrocarbon, and a pigment, said vehicle comprising approximately two thirds of the entire composition.

8. In a coating composition of the character described, a vehicle comprising a binder and inert inorganic materials, said binder consisting essentially of the following ingredients in approximately the percentages by weight indicated based on the total weight of binder

| | Percent |
|---|---|
| Chlorinated rubber | 27½ to 55 |
| A chlorinated hydrocarbon selected from the group consisting of chlorinated paraffin, chlorinated terphenyl and mixtures thereof | 10 to 50 |
| Plasticizer | 22½ to 35 | said inert inorganic materials consisting essentially of the following ingredients in approximately the percentages by weight indicated based on the total weight of inert inorganic materials

| | Percent |
|---|---|
| Antimony oxide | 5 to 15 |
| Titanium dioxide | 15 to 50 |
| Asbestine | 10 to 40 |

9. In a coating composition of the character described, a vehicle comprising a binder and inert inorganic materials, said binder consisting essentially of the following ingredients in approximately the percentages by weight indicated based on the total weight of binder

| | Percent |
|---|---|
| Chlorinated rubber | 27½ to 55 |
| A chlorinated hydrocarbon selected from the group consisting of chlorinated paraffin, chlorinated terphenyl and mixtures thereof | 10 to 50 |
| Tricresyl phosphate | 22½ to 35 | said inert inorganic materials consisting essentially the following ingredients in approximately the percentages by weight indicated based on the total weight of inert inorganic materials

| | Percent |
|---|---|
| Antimony oxide | 5 to 15 |
| Titanium dioxide | 15 to 50 |
| Asbestine | 10 to 40 |

References Cited in the file of this patent

UNITED STATES PATENTS

| 2,077,094 | Byers | Apr. 13, 1937 |
| 2,120,222 | Spencer et al. | June 7, 1937 |
| 2,328,249 | Balassa | Aug. 31, 1943 |